April 13, 1926. 1,580,641

W. BIERMAN

SIDE BEARING

Filed Nov. 6, 1924 2 Sheets-Sheet 1

INVENTOR
William Bierman
By Ray, Totten & Martin
Attorneys

April 13, 1926.
W. BIERMAN
SIDE BEARING
Filed Nov. 6, 1924    2 Sheets-Sheet 2
1,580,641
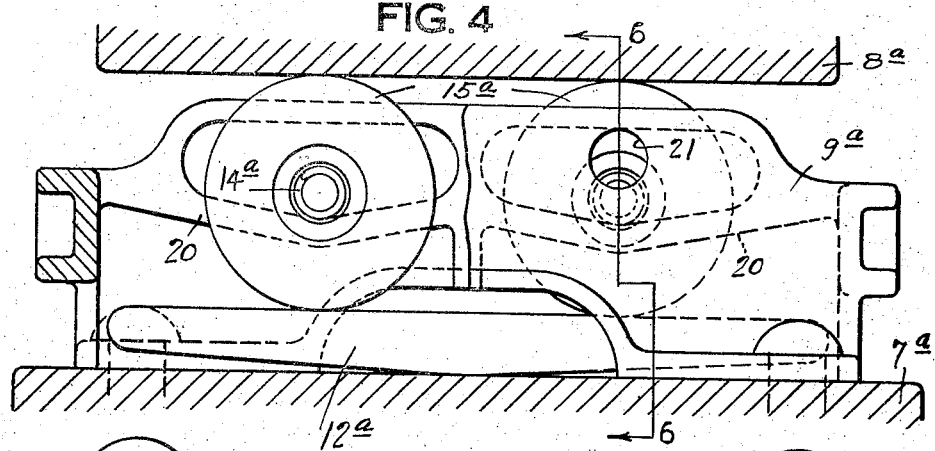
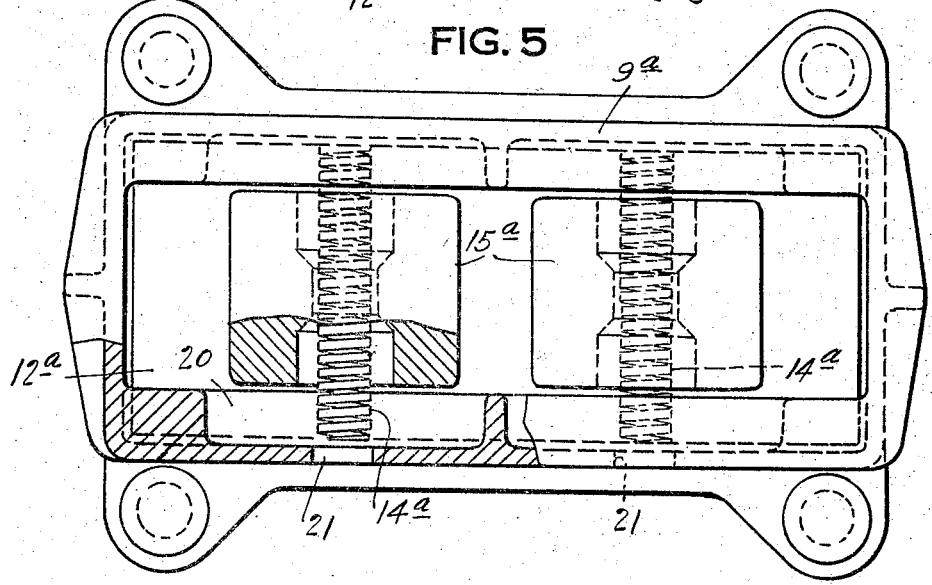
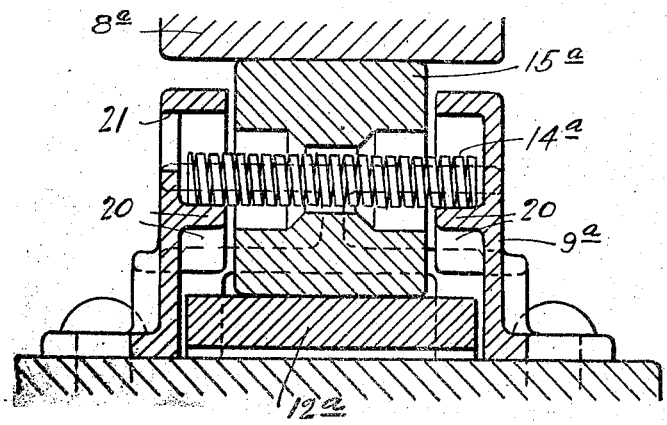
INVENTOR
William Bierman
By Kay, Totten & Martin,
Attorneys.

Patented Apr. 13, 1926.

1,580,641

UNITED STATES PATENT OFFICE.

WILLIAM BIERMAN, OF PITTSBURGH, PENNSYLVANIA.

SIDE BEARING.

Application filed November 6, 1924. Serial No. 748,186.

*To all whom it may concern:*

Be it known that I, WILLIAM BIERMAN, a citizen of the United States, and a resident of Pittsburgh, in the county of Allegheny and State of Pennsylvania, have invented a new and useful Improvement in Side Bearings; and I do hereby declare the following to be a full, clear, and exact description thereof.

My invention relates to side bearings, and particularly to an improved form of anti-friction bearing that is especially suitable for mounting between the body and truck bolsters of railway cars.

One object of my invention is to provide, in a bearing structure having a plurality of anti-friction rollers or the like, means for effecting distribution of the load or the shocks of impact between said anti-friction members.

Another object of my invention is to provide a side bearing of improved form that may be readily assembled and disassembled, and to simplify and improve generally the construction and operation of devices of this character.

Figure 1:
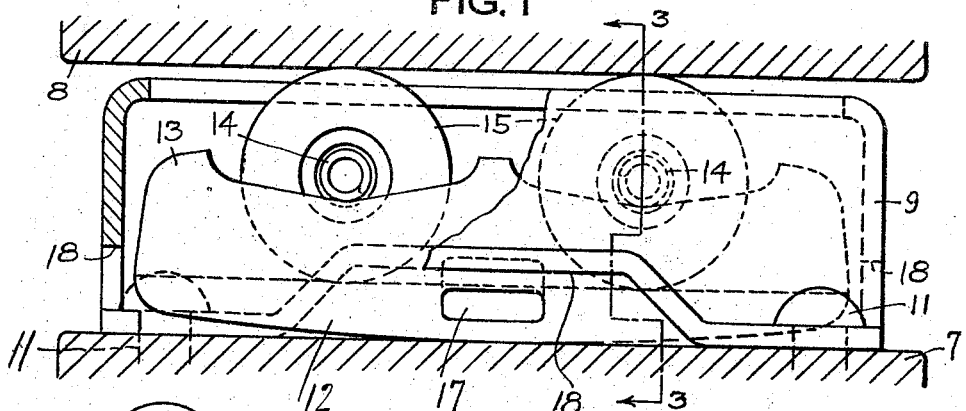
Figure 2:
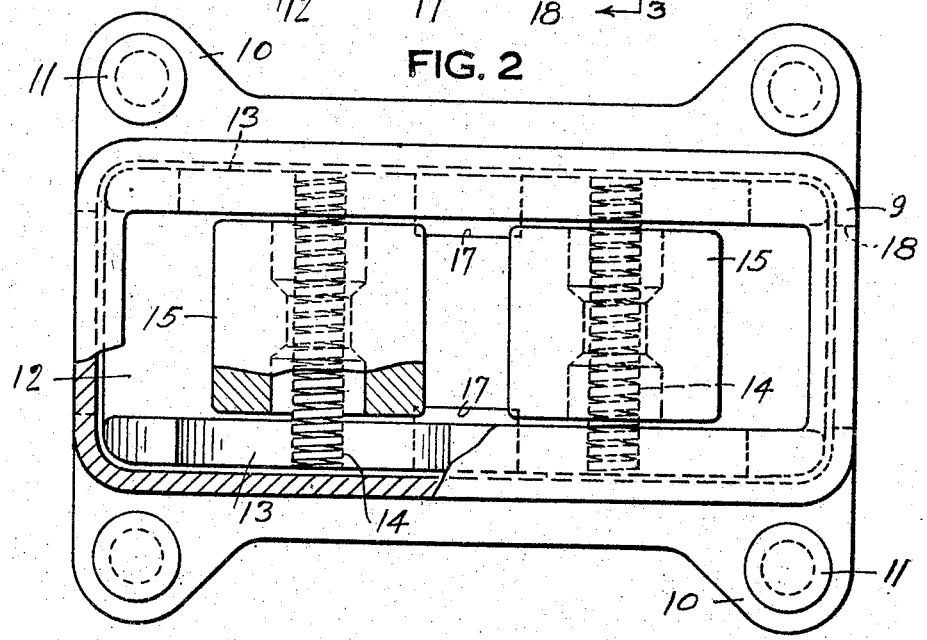
Figure 3:
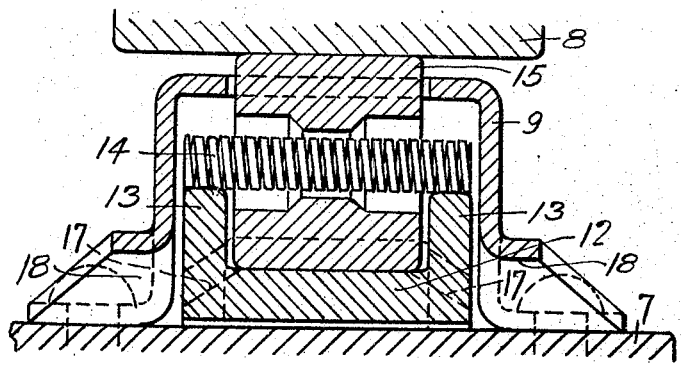

Some of the forms which my invention may take are shown in the accompanying drawings, wherein Fig. 1 is a side elevational view of a bearing structure embodying my invention; Fig. 2 is a view thereof, partially in plan and partially in section; Fig. 3 is a view taken on the line 3—3 of Fig. 1; Fig. 4 is a side elevational view of a modified form of bearing structure; Fig. 5 is a view thereof, partially in plan and partially in section, and Fig. 6 is a view taken on the line 6—6 of Fig. 4.

The device will be described with particular reference to its application in railway cars, although it may be useful in other relations.

The structure is shown as mounted upon a truck bolster 7, in position to support the body bolster 8 of a car body (not shown), and comprises a housing 9, preferably of pressed metal, and having perforated flanges 10 by means of which the housing may be secured to the bolster 7 through the medium of bolts 11.

As shown more clearly in Fig. 3, a bearing plate 12 is disposed within the housing 9 and rests upon the truck bolster 7. The bearing plate 12 is of arcuate form at its underside, as shown in Fig. 1, so that it may rock upon the bolster 7, in a manner to be hereinafter described.

The plate 12 is provided with flanges 13 whose upper edges are cut away as indicated more clearly in Fig. 1, to form inclined tracks for the ends of springs 14 that extend through rollers 15 which normally rest upon the upper flat surface of the plate 12. When the rollers occupy the positions indicated in Figs. 1 to 3, they are supported entirely upon the base plate 12, and the springs 14 are free of tension. Upon engagement of the body bolster 8 with the rollers 15 and simultaneous swiveling movement of the truck with respect to the car body, the rollers are caused to move, carrying with them the springs 14. As the rollers move along the bearing plate, the ends of the springs 14 are engaged by the inclined edges of the sides 13, and such ends are deflected upwardly with respect to the mid portion of the spring. Upon release of the load upon the rollers 15, the springs may return to their normal straight line positions, raising the rollers slightly, and the springs then act as axles, rolling down the inclined surfaces and carrying the rollers to their normal positions. This broad idea, however, forms no part of the present invention.

An important feature of my invention resides in the provision of the bearing plate 12 in the form of a rocker, so that as the body bolster 8 impinges upon the tops of the rollers 15 each roller will assume its full share of the load, by reason of the equalizing action of the rocker. The swaying of a car body relative to a truck imparts blows to the rollers so that it is necessary to provide a maximum amount of resistance to such pounding action, without sacrificing the advantages of anti-friction devices. In cases where there is inadequate provision for equalization, this pounding, rapidly distorts the bearing surfaces and the unequal distribution of the weight upon the rollers becomes aggravated. Furthermore, the irregularities thereby created in the bearing surfaces tend to destroy the effectiveness of the rollers as anti-friction devices.

Openings 17 are provided in the side walls 13 of the bearing plate 12 and openings 18 in the sides and ends of the housing 9, to permit the escape of moisture and dirt from within the bearing structure.

By reference to Fig. 3 it will be seen that the roller, spring, and the bearing plate may be assembled and then inserted through the bottom opening of the housing 9, and the housing 9 then mounted in position upon the truck bolster.

By referring now to Figs. 4 to 6, it will be seen that I provide a slightly different form of housing and bearing plate. In this form of device, the housing 9ᵃ is mounted upon the bolster 7ᵃ in substantially the same manner as is the housing 9 of Fig. 1. However, the housing 9ᵃ is provided with ledges 20 that are inclined as shown in Fig. 4 and serve as tracks or runways for the ends of the springs 14ᵃ that carry rollers 15ᵃ corresponding to the rollers 15. The bearing plate 12ᵃ is of arcuate form so that it may rock upon the bolster 7ᵃ in the same manner as does the plate 12. However, upstanding flanges upon the plate 12ᵃ are not required in this structure.

The rollers and springs, as well as the rocker plate 12ᵃ, of Figs. 4 to 6 function in substantially the same manner as do the corresponding parts in the structure of Figs. 1 to 3.

In the structure of Fig. 6, the device may be assembled by mounting the housing 9ᵃ and the plate 12ᵃ upon the bolster 7ᵃ and thereafter inserting the roller 15ᵃ through the top of the housing 9ᵃ and inserting the spring 14ᵃ through the opening 21, although the spring and rollers may be inserted before the housing is mounted upon the bolster, is desired.

Various changes in detail and general arrangement may be made without departing from the spirit and scope of the invention as defined in the accompanying claims; for instance, the position of the equalizing plate with respect to the rollers may be substantially reversed, and the rollers at their bottom portion bear upon a fixed surface.

I claim as my invention:

1. Bearing structure comprising a plate having a curved bearing surface upon one side and a substantially flat surface upon the other side, said plate normally resting solely at substantially a mid-point on its curved surface, a roller normally supported upon said flat surface at each side of said mid-point and having rolling movement on said surface, a bearing member movable into engagement with the rollers at points opposite to their points of contact with said flat surface, and means for effecting return movement of said rollers to their normal positions after deflection therefrom.

2. Bearing structure comprising a plate having a curved bearing surface upon one side and a roller-contacting surface upon the other side, said plate normally resting solely at substantially a mid-point on its curved surface, a roller normally supported upon said contacting surface at each side of said mid-point and having rolling movement on said surface, a bearing member movable into engagement with the rollers at points opposite to their points of contact with said contacting surface, and means for effecting return movement of said rollers to their normal positions after deflection therefrom.

In testimony whereof I, the said WILLIAM BIERMAN, have hereunto set my hand.

WILLIAM BIERMAN.